Figure 1:
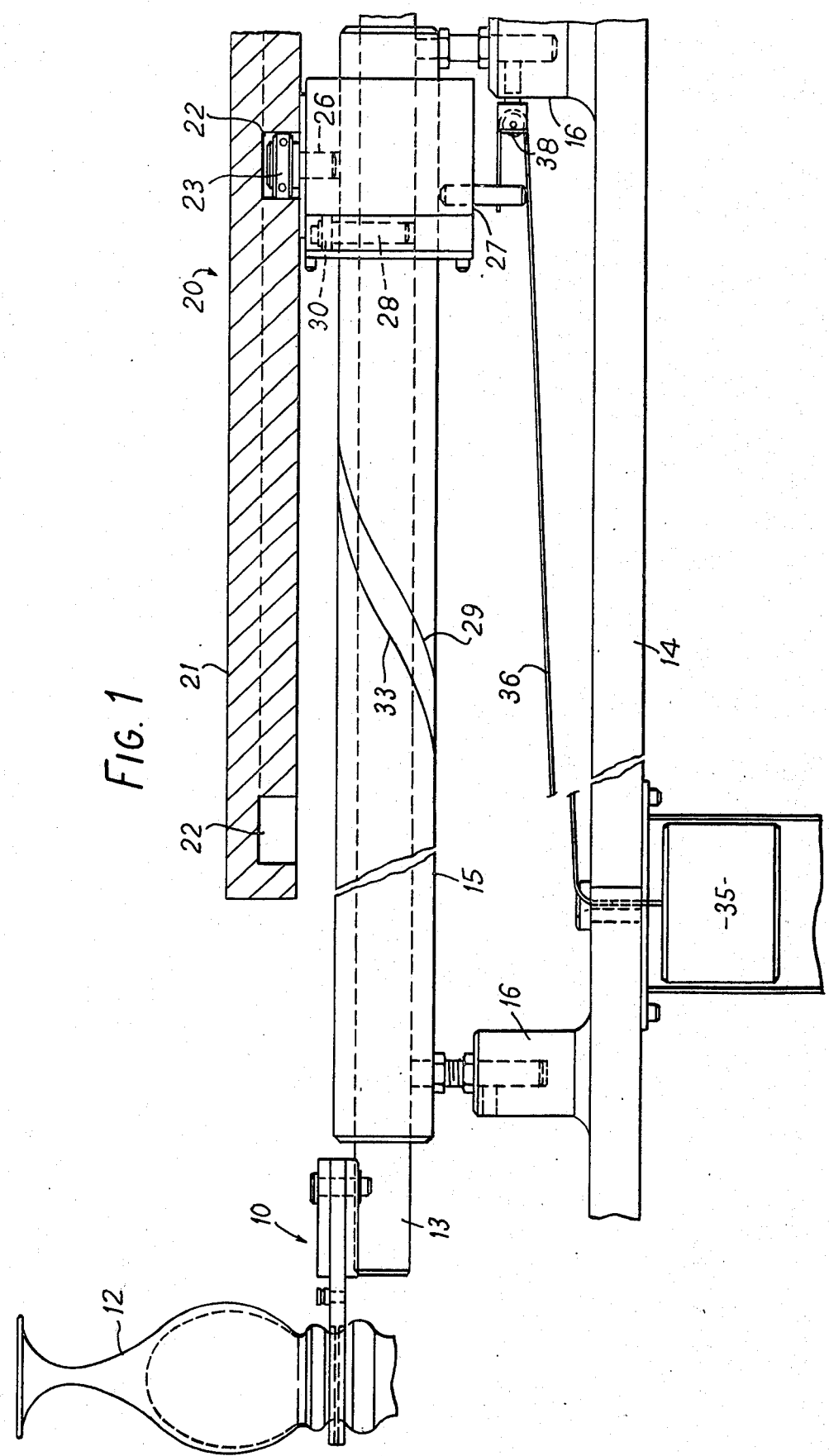

United States Patent [19]
Chambers

[11] 3,995,745
[45] Dec. 7, 1976

[54] ARTICLE TRANSFER UNIT

[75] Inventor: Arnold Chambers, Chesterfield, England

[73] Assignee: Glass Tubes and Components Limited, Chesterfield, England

[22] Filed: Mar. 7, 1975

[21] Appl. No.: 556,208

[52] U.S. Cl. .............................. 214/1 BB; 74/22 R; 214/1 BC; 214/1 BD; 214/1 Q
[51] Int. Cl.² ........................................ B65G 47/00
[58] Field of Search .............. 214/1 BB, 1 B, 1 BC, 214/1 BD, 1 BT, 1 BH, 1 BV, 130 R, 147 R, 147 G, 147 T, 151, 1 Q; 74/22 A, 22 R

[56] References Cited
UNITED STATES PATENTS
3,420,384  1/1969  Youngman ..................... 214/1 BD Primary Examiner—Frank E. Werner
Attorney, Agent, or Firm—Robert F. O'Connell

[57] ABSTRACT

A unit for transferring an article from one work station to another has a rotary table with an arm mounted on the table for reciprocation in a radial direction, the arm carrying an article holder at its outer end and being reciprocable by means of a cam follower coupled to the arm and engaging a stationary cam track. The arm has a radial pin engaging in a helical slot in a bearing sleeve whereby reciprocation of the arm also rotates the arm to invert the article holder.

5 Claims, 2 Drawing Figures

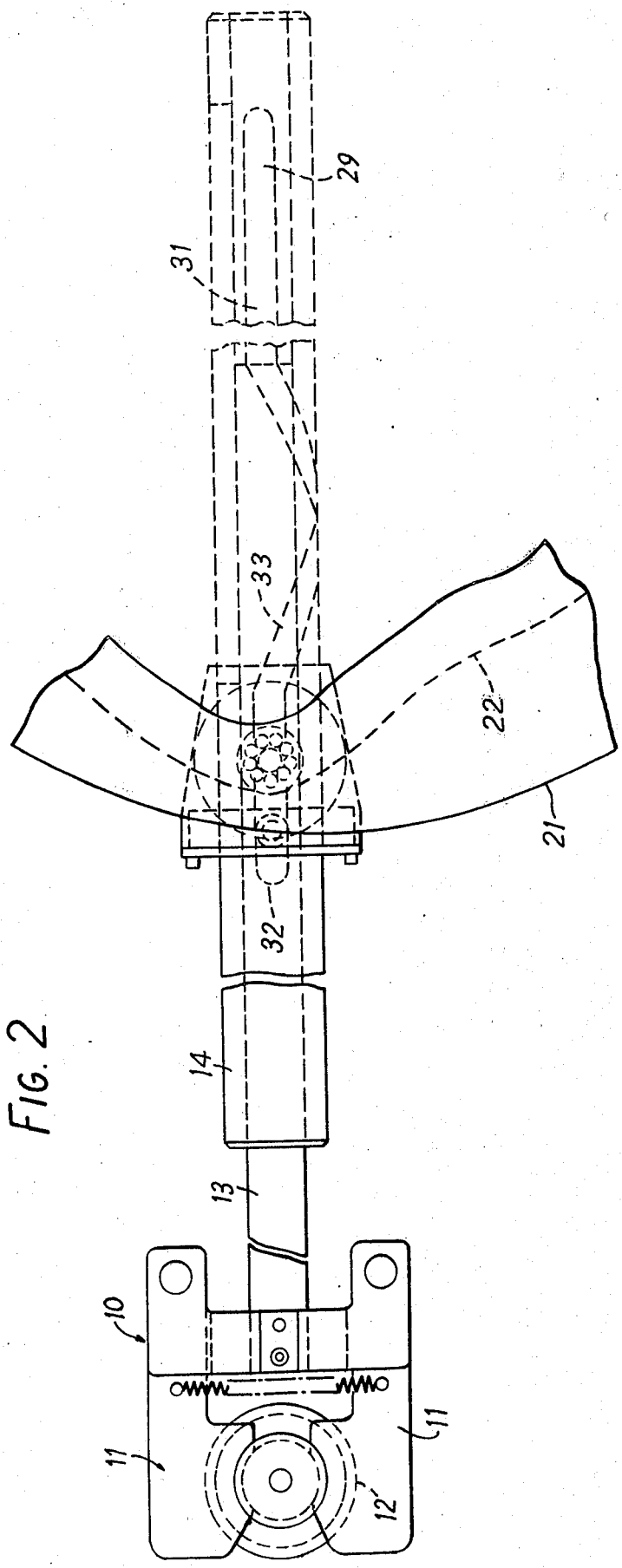

ARTICLE TRANSFER UNIT

The present invention relates to an article transfer unit for transferring an article from one work station to another, e.g. in a factory. The unit can be used to collect articles from one machine and present them to another machine provided for carrying out steps in a manufacturing process.

According to the present invention, there is provided a unit for transferring an article from one work station to another, wherein an article holder is mounted on an arm supported by a carriage for reciprocating movement relative to the carriage, the carriage being movable along a given path for carrying the arm between the stations, and camming means for effecting advancing and retracting movements of the arm relative to the carriage during its travel along the said path, the camming means including a cam track which is stationary with respect to the carriage and a cam follower which is moved along the track in response to relative motion between the carriage and the track, the follower being coupled to the arm to move the latter relative to the carriage. The shape of the track determines the movements of the arm relative to the carriage. The reciprocal advancing and retracting movements of the arm relative to the carriage would normally be in a different direction from the movement of the arm by virtue of the travel of the carriage. For example, the arm may reciprocate generally at right angles to the direction of carriage movement.

In a preferred embodiment, the carriage is a rotatable table and the arm is disposed for reciprocation in a radial direction. In use, the holder on the arm will describe an arcuate sweep as the table rotates, and will move in and out radially under the control of the camming means.

Conveniently, the track is formed in a stationary cam plate as a groove or slot which receives the follower, the follower preferably having a ball race engaging the groove for smoothness of operation. Where the carriage is a rotatable table, the groove or slot can be endless to enable the arm to make identical repetitive movements with each revolution of the table.

Preferably, the coupling between the cam follower and the arm causes the arm to rotate in addition to advancing and retracting. Rotation of the arm can, for instance, be through 180° to cause inversion of the holder and an article held thereby. One way of achieving rotation is to provide the arm with a scroll or helical groove receiving a pin forming part of the follower. As the pin moves with the follower, it traverses the groove, simultaneously causing the arm to rotate.

In a preferred embodiment, the arm is slidably and rotatably received in a bearing sleeve fixed to the table, the sleeve having a slot including a helical portion, and a pin coupling the arm to the follower projects through the slot of the sleeve. The pin is axially movable by a coupling block which is slidable along the sleeve, and a second pin couples the block to the follower. Movement of the follower along the cam track is accompanied by movement of the block, and thus of the pin attached to the arm, which is constrained to rotate when the pin rides along the helical portion of the slot.

It may be desired to secure the sleeve detachably to the table, in order that the sleeve can be replaced by another one having a differently shaped slot, inter alia to facilitate altering the arc through which the arm is rotated.

The article holder is preferably detachably mounted on the arm for ready replacement of the holder, should it be desired to use the unit for transferring articles of different shapes.

Biasing means can be provided to assist the follower in moving along the cam track out of the extreme positions adopted thereby when the arm is in its advanced and retracted positions.

The present invention will now be described by way of example with reference to the accompanying drawings, in which:

FIG. 1 is a side elevation, with part in cross section, showing an article transferring unit embodying the present invention, and FIG. 2 is a top plan view of the unit shown in FIG. 1.

The apparatus shown in the drawings includes a unit for handling articles during a manufacturing operation. The unit is intended to receive an article and to transfer it to a work station and there to deposit the article. Alternatively, the unit may continue holding the unit whilst a manufacturing operation is performed thereon at the work station. The unit may be used to receive and deliver an article from one machine to another. The exact role which the unit is to play in a manufacturing operation will ultimately be decided by the manufacturer. The unit shown in the drawings was designed primarily for use in a drinking glass making factory.

The unit has an article holder 10 including a pair of spring-loaded jaws 11 between which the article, an unfinished drinking glass 12, is gripped. The jaws can, in this example, be opened or closed to admit or release the glass 12 merely by pushing or pulling the glass in the appropriate direction.

The holder 10 is secured to one end of an elongated arm or spindle 13 which is supported on a carriage. The holder 10 is detachably secured to enable it to be replaced by alternative holders designed for receiving articles of different shapes. The carriage is movable to cause the arm 13 to travel along a given path between two work stations, not shown. The support of the arm 13 is such that the arm can reciprocate between advanced and retracted positions. The arm 13 reciprocates in a lengthwise direction, and is shown retracted in FIG. 1 and advanced in FIG. 2.

The carriage 14 is a rotatable table. As it rotates, therefore, the holder 10 describes a circular sweep. The arm 13 extends in a radial direction and is supported for reciprocal radial movement by a bearing sleeve 15. The sleeve is fixedly secured to posts 16 on the table 14.

Camming means 20 are provided for reciprocating the arm 13 at selected points in its circular sweeping movement. The camming means 20 includes a cam plate 21 having an endless cam track 22 in the form of a groove. Received in the cam track 22 is a follower 23, which is coupled to the arm 13. The follower 23, like the arm 13, rotates with the table 14 and is free to move radially with the arm. The cam plate 21, on the other hand, is stationary with respect to the table. Thus, relative movement between the table 14 and cam plate 21 causes the follower 23 to progress along the cam track 22 and thereby move the arm 13 radially. The positions of the follower 23 shown in FIGS. 1 and 2 correspond to the innermost and outermost limits between which the arm 13 can move, that is when fully retracted and fully advanced. It will be understood that the precise shape of the track 22 controls the distance moved in the radial direction by the follower 23 and hence by the arm 13. Furthermore, the shape of the track 22 determines the rate at which the arm 13 is advanced and retracted for any given speed of rotation of the table 14, as well as the points during rotation at which the arm is fully advanced and retracted.

For smoothness of operation, the cam follower 23 has a ball race which engages the cam track 22. The cam follower 23 is mounted on a pin 26 which is fixed in a coupling block 27. The coupling block 27 has a bore through which the sleeve 15 passes and the block 27 is slidable along the sleeve. A pin 28 is secured in a transverse hole bored in the arm 13. The pin 28 extends through a slot 29 in the sleeve 15 and carries a ball race 30 which lies within an annular recess in the forward end of the block 27. Thus radial movements of the cam follower 23 effected by the cam track 22 are transmitted by way of the block 27, the ball race 30 and the pin 28 to the arm 13. At the same time the arm 13, together with the pin 28 and ball race 30, are free to rotate relative to the block 27 about the axis of the arm 13.

It is arranged that movements of the cam follower 23 along the cam track 22 not only reciprocate the arm 13, but also rotate the arm through a predetermined angle. In the present instance, the arm rotates through 180° about its longitudinal axes during its travel between its two extreme limits of movement. Thus, the unit effects an inversion of the glass 12 whilst moving it from one work station to the other.

The slot 29 of the sleeve has two end portions 31, 32 which extend lengthwise along the sleeve 15. Whilst the pin 28 is moved along these straight portions 31, 32, rotation of the arm 13 is impossible. Between the two end portions 31, 32, the slot has a scroll or helical portion 33. Thus, as the follower 23 urges the block 27 from the position shown in FIG. 1, the pin 28 initially moves along the straight end portion 31. The arm 13 thus begins moving outwardly without rotation. As soon as the pin 28 enters the helical portion 33, it is deflected thereby anti-clockwise, causing the arm 13 to begin rotating. Anti-clockwise rotation continues as the block 27 is moved forwardly by the follower 23, the arm 13 advancing whilst rotating. When the pin 28 leaves the helical portion 33 and enters the end portion 32, rotation of the arm 13 ceases, although the block 27 and arm 13 continue to advance until the arm 13 reaches its fully advanced position.

For inversion, i.e. rotation through 180°, the helical portion 33 extends around half the perimeter of the sleeve 15. The end portions 31, 32 are thus diametrically opposed. Greater or lesser rotations are obtained by lengthening or shortening the angular extent of the helical portion.

The shape of the cam track 22 may in some cases be such that the track is unable alone to move the follower 23 from one or the other of its extreme positions. Biasing means may thus be required to assist the cam track 22 in moving the cam follower 23. Any convenient biasing means may be employed, such as tension or compression springs acting between the arm 13 and the fixed sleeve 15. In the illustrated embodiment, the biasing means takes the form of a weight 35 suspended from one end of a cable 36 attached at its other end to the block 27. As shown, the weight 35 biases the block 27 and hence the follower 23 in an arm-retracting direction. By omission of the pulley 38, the weight 35 is caused to bias the follower in the opposite direction.

Where inversion or rotation of the arm 13 is not required, the present sleeve 15 could be replaced by one having a straight slot. Alternatively, the sleeve 15 could be omitted altogether, as well as the coupling block 27 illustrated. The pin 26 could then be secured directly to the arm 13. It will be appreciated that, in such a modification, the posts 16 should carry support bearings for the arm 13.

The unit described above and shown in the drawings can be but one of a number of identical units, e.g. 24, spaced equally around the circumference of the table 14.

I claim:

1. A unit for transferring an article from one work station to another comprising an article holder, an arm on which the article holder is mounted, a carriage supporting said arm for reciprocating movement relative to the carriage, means for moving the carriage to carry the arm along a path between said work stations, and camming means for effecting reciprocatory movement of said arm during its travel along said path, the camming means comprising a cam track and a cam follower coupled to the arm and cooperating with the cam track upon movement of the carriage, said unit further having rotary drive means coupling said cam follower to said arm whereby said arm is rotated as it is reciprocated, the said rotary drive means comprising a bearing sleeve fixed to the carriage, said arm being slidably and rotatably received in the bearing sleeve, said bearing sleeve having a slot including a helical portion, and a pin fixed to the arm and extending through the slot, the pin being coupled to the cam follower for movement of the pin along the sleeve.

2. A unit as claimed in claim 1 having a block mounted for axial sliding along the bearing sleeve, said block carrying the cam follower and bearing at one end against the pin fixed to the arm.

3. A unit as claimed in claim 1 in which the reciprocating movements of the arm are in a direction at right angles to the said path of travel.

4. A unit as claimed in claim 3 wherein the carriage is a rotatable table and the arm is mounted for reciprocation in a direction radial to the table.

5. A unit as claimed in claim 4 in which the cam track is an endless groove in a stationary member.

* * * * *